US005141572A

United States Patent [19]

Gerber

[11] Patent Number: 5,141,572

[45] Date of Patent: Aug. 25, 1992

[54] LABELLING APPARATUS AND METHOD FOR A SHEET MATERIAL CUTTING SYSTEM AND A SUPPLY OF LABELS FOR USE THEREWITH

[75] Inventor: H. Joseph Gerber, West Hartford, Conn.

[73] Assignee: Gerber Garment Technology, Inc., Tolland, Conn.

[21] Appl. No.: 585,711

[22] Filed: Sep. 19, 1990

[51] Int. Cl.[5] .............................................. B32B 31/00

[52] U.S. Cl. ...................................... 156/64; 156/362; 156/556; 156/574

[58] Field of Search ................. 156/64, 353, 361, 362, 156/510, 511, 540, 541, 542, 556, 574

[56] References Cited

U.S. PATENT DOCUMENTS

| | | | |
|---|---|---|---|
| 3,641,319 | 2/1972 | McGuire | 235/61.12 R |
| 3,765,349 | 10/1973 | Gerber | 112/121.14 |
| 3,887,903 | 6/1975 | Martell | 340/172.5 |
| 3,891,492 | 6/1975 | Watson | 156/351 |
| 4,028,167 | 6/1977 | Gerber | 156/384 |
| 4,189,337 | 2/1980 | Higgins et al. | 156/351 |
| 4,240,848 | 12/1980 | Barber | 156/64 |
| 4,514,246 | 4/1985 | Forrer et al. | 156/264 |
| 4,557,790 | 12/1985 | Wisbey | 156/511 |
| 4,875,121 | 8/1989 | Markley et al. | 156/64 |
| 5,017,257 | 5/1991 | Murphy | 156/268 |

*Primary Examiner*—David A. Simmons
*Assistant Examiner*—J. Sells
*Attorney, Agent, or Firm*—McCormick, Paulding & Huber

[57] ABSTRACT

In a sheet material cutting system a labelling apparatus applies labels to the top surface of work material to identify the parts cut therefrom. The labelling apparatus is a unitary self-driven and self-controlled unit using pre-printed labels each providing a visual display for identifying the associated cut part, and associated with each label is a machine sensible code identifying the position on the work material at which the label is to be applied. Control cabling for the labelling apparatus is thereby avoided and the apparatus may be designed for easy transport from one point of use to another.

23 Claims, 7 Drawing Sheets

LABELLING APPARATUS AND METHOD FOR A SHEET MATERIAL CUTTING SYSTEM AND A SUPPLY OF LABELS FOR USE THEREWITH

BACKGROUND OF THE INVENTION

This invention relates to the cutting of cloth and similar sheet material, either as a single sheet or a lay-up of sheets, to cut parts or pattern pieces from the material with labels being placed on or near the cut parts to identify them during subsequent handling; and deals more particularly with improvements in the apparatus, labels and methods used in the labelling procedure.

In the cutting of sheet material, particularly limp sheet material such as cloth, it is customary to produce, through the use of computer assisted means, a marker, which may for example appear on the screen of a visual display unit, indicating the shapes and arrangement of parts to be cut from a quantity of work material. The information inherent in this marker is then processed in combination with ancillary input data to provide a set of marker instructions, or a drawn marker, usable by a cutting system. The cutting system includes a means for spreading a single sheet, or a lay-up of sheets, of sheet material to be cut, an automatically controlled cutting machine using the marker instructions or a manually controlled cutting machine using the drawn marker as a pattern for cutting the spread material, and a labeller operable to apply labels to the top surface of the work material, either before or after the cutting, to identify the parts cut from the material. In cases where the work material is a lay-up of sheets each "part" cut from the material actually consists of a stack of individual pieces and the system often also includes a bundler for bundling together the pieces comprising each such stack prior to the separation of the stacks from the waste material. An apparatus and method for making a marker representation is shown, for example, in U.S. Pat. No. 3,887,903. Labelling devices for use with sheet material cutting systems of the type in question are shown by U.S. Pat. Nos. 4,028,167, 4,189,337 and 4,514,246. Bundling devices are known from U.S. Pat. No. 3,765,349 and are also shown by pending U.S. patent application Ser. No. 07/452,622, filed Dec. 19, 1989 and entitled "Method and Apparatus For Bundling and Removing Stacks of Pieces Cut From Lay-ups of Sheet Material", which application is assigned to the same assignee as this application.

As evident from the patents mentioned above, in the past it has been customary to mount the labeller either on the same carriage as the cutting head or on the carriage of the spreader and to control the positioning and operation of the labeller through the same controller as used to control the cutting head or spreader. Such labellers customarily include self-contained printers, with the information to be displayed by each label being printed by the labeller immediately prior to, or during, the application of the label to the work material.

The mounting of a labeller to a cutting head carriage or a spreader carriage has the disadvantage of preventing the cutting head or spreader from being used for its normal cutting or spreading purpose during the labelling procedure, and the reverse disadvantage of preventing the labeller from being used while the associated cutting head is used for cutting or the associated spreader used for spreading. Further, prior labellers have in general been of relatively complex and costly construction, and due to the printers used in such labellers preferably being of relatively small size and light weight the quality of the printing applied to the labels has tended to be of relatively poor quality. Also, all of the information to be printed onto the labels has had to be included in the instructions provided to the controller for the cutting head or spreader. The rate of label application has tended to be low because of limitations arising from the maximum speeds at which the associated cutting head carriage or spreader can be driven.

The general object of the invention is therefore to provide improvements in the application of labels to sheet material cut or to be cut by means of an automatically controlled cutting machine, such improvements residing in the labelling apparatus, in the supply of labels used by such apparatus, and in the method of generating and applying the labels.

A more particular object of the invention is to provide a labelling apparatus of simple construction capable of being made at low cost and of relatively light weight, which can be driven at relatively high speeds and rates of label application, which can be readily transferred between multiple points of use, which does not require cabling for connection to the cutting head or spreader controller or for other purposes, and which conveniently allows the application of labels having displays of high print quality.

In keeping with the foregoing object a still more specific object of the invention is to provide a labelling apparatus and related method of operation whereby the labels used by the apparatus are pre-printed before their association with the labeller thereby allowing the labels to be printed in advance of their use by a high quality printer located remote, if desired, from the cutting and/or spreading operations and which printer may be used efficiently during a given period of operation for printing labels for many different jobs with which the labeller is to be used.

Also in keeping with the above-stated objects, a more specific object of the invention is to provide a labelling apparatus and related method wherein the apparatus is a unitary selfdriven and self-controlled module capable of easy transfer from one point of use to another without requiring control cabling and connection to separate control equipment, the apparatus including a labeller, a means for moving the labeller relative to the supporting surface on which the work material is supported and a controller, with the labeller using a label supply means providing labels with pre-printed displays and also providing for each label a position code containing information identifying the position at which the label is to be applied to the work material, the drive means through the controller being responsive to such position codes to drive the labeller to the related points of label application.

Another object of the invention is to provide a labelling apparatus of the aforegoing character in which the applied labels may be of variable length and/or width.

A still further object of the invention is to provide a supply of labels for use with a labelling apparatus and method of the types mentioned.

Still other objects and advantages of the invention will be apparent from the following detailed description of a preferred embodiment of the invention in conjunction with the accompanying drawings and claims.

SUMMARY OF THE INVENTION

The invention solving the aforementioned objects resides in a labelling apparatus having a means for receiving and holding a label supply means providing a plurality of pre-printed labels and also providing for each label a machine sensible code containing position information defining the position at which the label is to be applied to the top surface of work material, a reading means for reading the sensible codes, a means responsive to the position information as read by the reading means for moving the labels relative to the supporting surface on which the related work material is supported to bring them to the positions defined by the coded position information, and a means operable after the defined positions are reached by the labels for applying them to the top surface of the work material. The invention also resides in these components being part of a unitary module which is readily connected to and disconnected from the means providing the supporting surface to enable the apparatus to be quickly and easily moved from one point of use to another as, for example, to any one of a selected number of spreading tables on which work material is spread prior to being cut by the cutting machine.

The invention more specifically resides in the means for applying the labels to the top surface of the work material being a labeller and to the means for moving the labels to the defined positions being a means for moving the labeller in two coordinate directions relative to the supporting surface.

The invention also resides in the method for cutting sheet material comprising the steps of preparing a marker indicating the shapes and arrangement of parts to be cut from work material, from the marker preparing a set of cutting information usable by an automatic cutting machine to cut parts from work material in accordance with the marker, preparing a set of label information defining the text to be displayed by each label and also providing position information defining the position at which each label is to be applied to the work material, using the label information to print labels including the desired text and also to associate with each such printed label a machine sensible code containing its position information, reading a sensible code to extract the position information, using the extracted position information to position the associated label at its desired position on the work material, and then applying the label to the work material.

The invention also resides in the provision of a supply of labels usable with the apparatus and method of the invention, which supply of labels includes a plurality of labels each containing a printed display identifying the cut part with which it is to be associated, and which label supply means also includes for each label a code sensible by an associated reader in the labelling apparatus for identifying the position on the work material at which the label is to be applied.

The invention further resides in a labelling apparatus, and an associated supply of labels and method, whereby the labels applied to the work material may be of variable length and/or width.

The invention also resides in other features of the labelling apparatus, labelling method and label supply means defined by the appended claims.

DETAILED DESCRIPTION OF THE PREFERRED EMBODIMENTS

Figure 1:
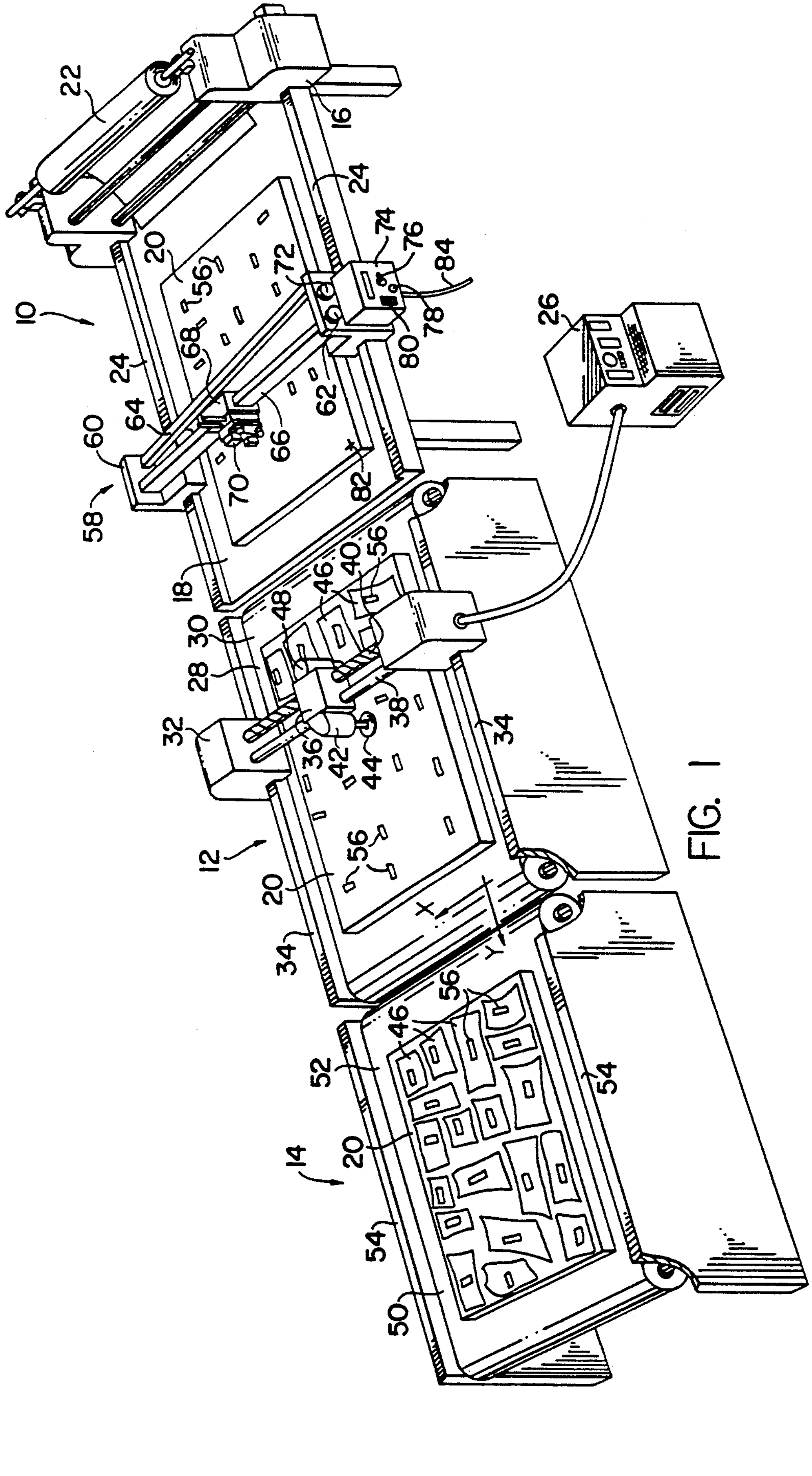
FIG. 1 is a schematic perspective view showing a sheet material cutting system using a labelling apparatus embodying the invention.

The labelling apparatus, labelling method and label supply of this invention may be used with a wide variety of cutting systems wherein the sheet material to be cut is first spread and then cut by a cutting machine. An exemplary one of such systems is shown in FIG. 1. Referring to this figure, the illustrated system includes a spreading table 10, an automatic cutting machine 12, and an unloading table 14. The spreading table 10 cooperates with a spreader 16 for spreading onto a supporting surface 18 a quantity of sheet material to be cut. This quantity of sheet material may consist of a single sheet of sheet material, but in the illustrated case is shown to comprise a lay-up 20 of a number of sheets of sheet material superimposed on one another. In forming the lay-up 20 the spreader 16 moves back and forth along the length of the table 16 and spreads material onto the supporting surface 18 from a supply roll or bolt 22 of cloth or other limp sheet material to be cut. In this movement the spreader 16 is supported by two guide rails 24, 24 extending along opposite sides of the supporting surface 18 which guide rails may include racks for driving engagement with pinions driven by a motor (not shown) in the spreader 16 for effecting the desired spreader movement.

In FIG. 1 the spreading table 10 is shown for convenience of illustration to be relatively short. In a typical installation, however, such table may be quite long, often having a length of fifty feet or more. After a lay-up 20 of work material has been created on the supporting surface 18 of the spreading table the lay-up is moved to the cutting machine 12 for the cutting of pattern pieces therefrom in accordance with marker information supplied to an associated controller 26. The cutting machine has a work material supporting surface 28 which may be stationary, but in the illustrated case is shown to be formed by an endless conveyor member 30. To aid in shifting the lay-up 20 from the spreading table to the cutting machine 12, the supporting surface 18 of the spreading table may include pressurized air outlets to form an air cushion under the lay-up enabling the lay-up to be easily slid over the supporting surface 18 to bring its forward end into contact with the supporting surface 28 of the cutting machine, after which the conveyor member 30 may be operated to pull the lay-up from the spreading table onto the cutting machine. In FIG. 1 the illustrated lay-ups 20 are shown to be of such lengths that a complete lay-up can be accommodated on the supporting surface 28 of the cutting machine. In many cases, however, the lay-ups are much longer (as in FIG. 2) than the length of the cutting machine supporting surface so that only a portion of a lay-up is fed at a time from the spreading table to the cutting machine for cutting.

The cutting machine 12 includes a Y carriage 32 supported by guide rails 34 extending along the opposite sides of the material supporting surface 28 for movement of the carriage 32 in the illustrated Y coordinate direction, the guide rails 34 including racks engagable by motor driven pinions in the carriage 32 for moving the carriage in the Y coordinate direction. An X carriage 36 is carried on the Y carriage 32 by a guide rail 38 and lead screw 40 for movement in the X coordinate direction. The carriage 36 carries a cutting head 42 having a vertically reciprocating knife 44. By combined movement of the carriage 32 in the Y coordinate direction and of the X carriage 36 in the X coordinate direction the knife 44 may therefore be moved along any desired line of cut relative to the lay-up 20. These movements are in turn controlled by the controller 26 so that pattern pieces, such as indicated at 46, are cut from the lay-up in accordance with the associated marker.

Since the lay-up 20 consists of a number of layers of sheet material, each pattern piece 46 as shown in FIG. 1 actually consists of a stack of such pieces. To keep the pieces of each stack associated with one another and to facilitate their removal from the waste material and other subsequent handling, the cutting machine 12 also includes a bundler 48 on the X carriage 36 operable to join together the pieces of each stack. The bundler may be operated either prior to or after the cutting of the stacks and may take various different forms using various different fastening means, such as stitches, staples, or pins without departing from the invention. Also, the bundler need not be associated with the cutting machine 12 and if desired may instead be associated with the spreading table 10 or the unloading table 14.

After a lay-up 20 (or portion of such lay-up) is cut by the cutting machine 12 it is moved to the unloading table 14 to permit the cut stacks of pattern pieces to be lifted or otherwise removed from the waste material while the cutting machine 12 is used to cut another lay-up or lay-up portion. The removal of the cut pieces may be performed either manually or by a robot (not shown). The table 14 includes a work material supporting surface 50 which may be stationary but in the illustrated case is shown to be provided by an endless conveyor member 52. Extending along the sides of the supporting surface 15 are two guide rails 54, 54 including racks which may be used to support a carriage (not shown) for performing other work functions on the lay-up supported by the surface 50.

In accordance with the invention, the system of FIG. 1 includes a labelling apparatus for applying labels to the lay-ups processed by the cutting system so that by the time a cut stack is removed from the waste material at the unloading table 14 it includes a label 56 containing a text display enabling it to be properly manually identified as the stack moves to further work stages. In FIG. 1 this labelling apparatus is indicated at 58 and is shown and herein described as being associated with the spreading table 10. Such association is not, however, essential to the broader aspects of the invention and if desired the labelling apparatus 58 may instead be associated with either the cutting machine 12 or the unloading table 14.

As shown in FIG. 1, the labelling apparatus includes a labelling carriage 60 supportable by the guide rails 24 of the cutting table 10 for movement in the Y coordinate direction and including pinions driven by a Y motor 62 meshing with the racks of the guide rails 24. The carriage also includes a structural beam 64 and a guide rail 66 extending transversely over the supporting surface 18. The guide rail 66 supports a work carriage 68 for movement along its length, in the illustrated X coordinate direction, and carries a labeller 70. Movement of the work carriage 68 along the length of the rail 66 is effected by a suitable drive means including an X motor 72. On one end of the carriage 60 is a controller 74 including a few simple manually operable control elements for controlling the operation of the apparatus, such control elements including a start/stop switch 76, an emergency stop switch 78, and a switch or set of switches 80 for initializing X and Y position memories associated with the controller when a reference point on the labeller 70 is moved into registration with an index mark 82 on the lay-up 20.

The labeller 70, as explained in more detail hereinafter, uses a supply of pre-printed labels which supply includes for each label a machine sensible code containing position information defining the position at which the label is to be attached to the top surface of the associated lay-up 20. Such information may for example consist of the X and Y coordinates of the point on the work material at which the label is to be applied, or may be the X and Y displacements of the point at which the label is to be applied from the point of application of the preceding or some other previously applied label or other previously designated reference point. The controller 74 in turn responds to the position information to drive the labeller 70, by combined movements of the carriage 60 in the Y coordinate direction and the work carriage 68 in the X coordinate direction, to bring the labeller to the code defined positions. Therefore, the labelling apparatus 58 is a unitary module which is self-driven and self-controlled so as to require no connection to an external controller by means of cabling. The problem of dealing with such cabling as the labelling apparatus moves along the length of a long spreading table is accordingly avoided. The only connection required by the labelling apparatus 58 is to a source of electrical power (and/or pressurized air in the event one or more components of the apparatus are powered by pressured air rather than electricity) through a power conducting line 84. This line 84 can be relatively small in size so as to be easily handled. However, if desired even the line 84 or its equivalent may be eliminated by providing a battery power source on the carriage 60, thereby making the labelling apparatus 58 completely free of connecting cables and conductors.

The labelling apparatus 58 is furthermore preferably designed so as to be readily mounted onto and dismounted from a spreading table 10, or other unit with which it may be used, and is made to be of a relatively light weight so as to be easily moved from one spreading table or the like to another.

Figure 2:
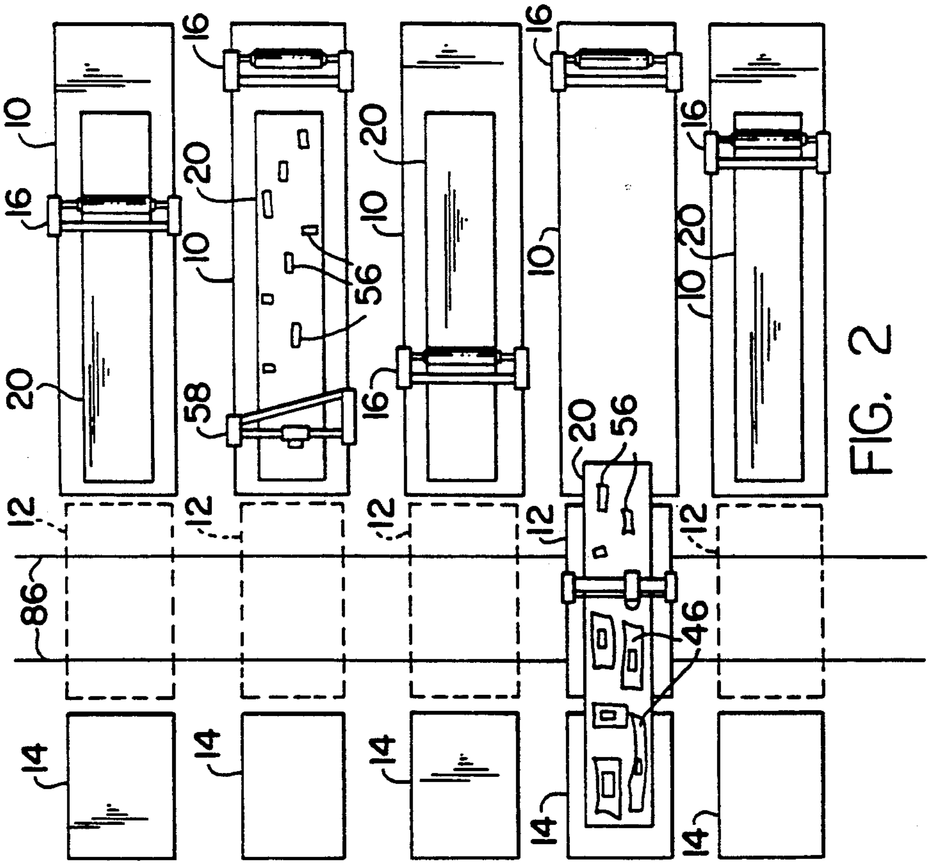
FIG. 2 is a schematic plan view illustrating an expanded sheet material cutting system incorporating the system of FIG. 1.

FIG. 2, for example, shows the layout of an expanded sheet material cutting system using the components of FIG. 1 and in which the transportability of the labelling apparatus 58 from one point of use to another is of particular benefit. This expanded system in addition to the spreading table 10, cutting machine 12, and unloading table 14 of FIG. 1 includes four additional spreading tables 10 and four additional unloading tables 14 all arranged as shown, with the cutting machine 12 being mounted on rails 86 permitting it to be moved into position for use with any one of the five spreading tables. The time required for spreading a lay-up on a spreading table 10, particularly in the case of a high lay-up, is usually quite longer than that required for labelling or cutting the lay-up. Therefore, in the illustrated case, while one spreading table 10 is used in cooperation with the cutting machine 12 for cutting a lay-up, and another spreading table 10 is used in cooperation with the labelling apparatus 58 for labelling a lay-up, three other spreading tables are available for use with their associated spreaders 16 for spreading lay-ups on their supporting surfaces. Of course, it will be obvious that the spreading, labelling, and cutting phases occur in rotation for each table, and when the labelling procedure is completed for one table the labelling apparatus 58 may be removed from it and transferred to the next table ready for labelling.

Figure 4:
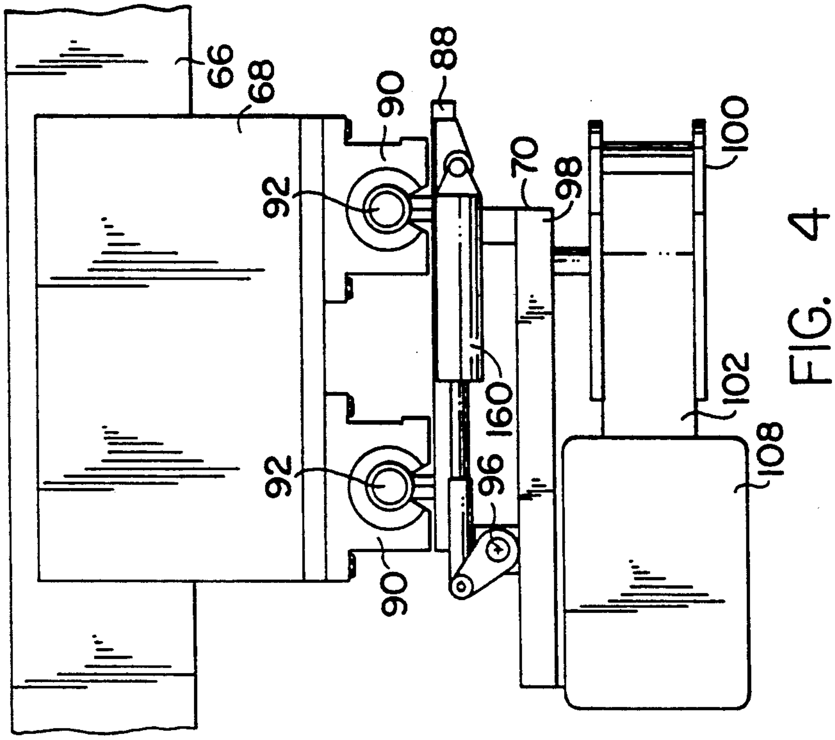
FIG. 4 is a plan view of the labeller of FIG. 3 with the labeller being shown in a first angular position.
Figure 3:
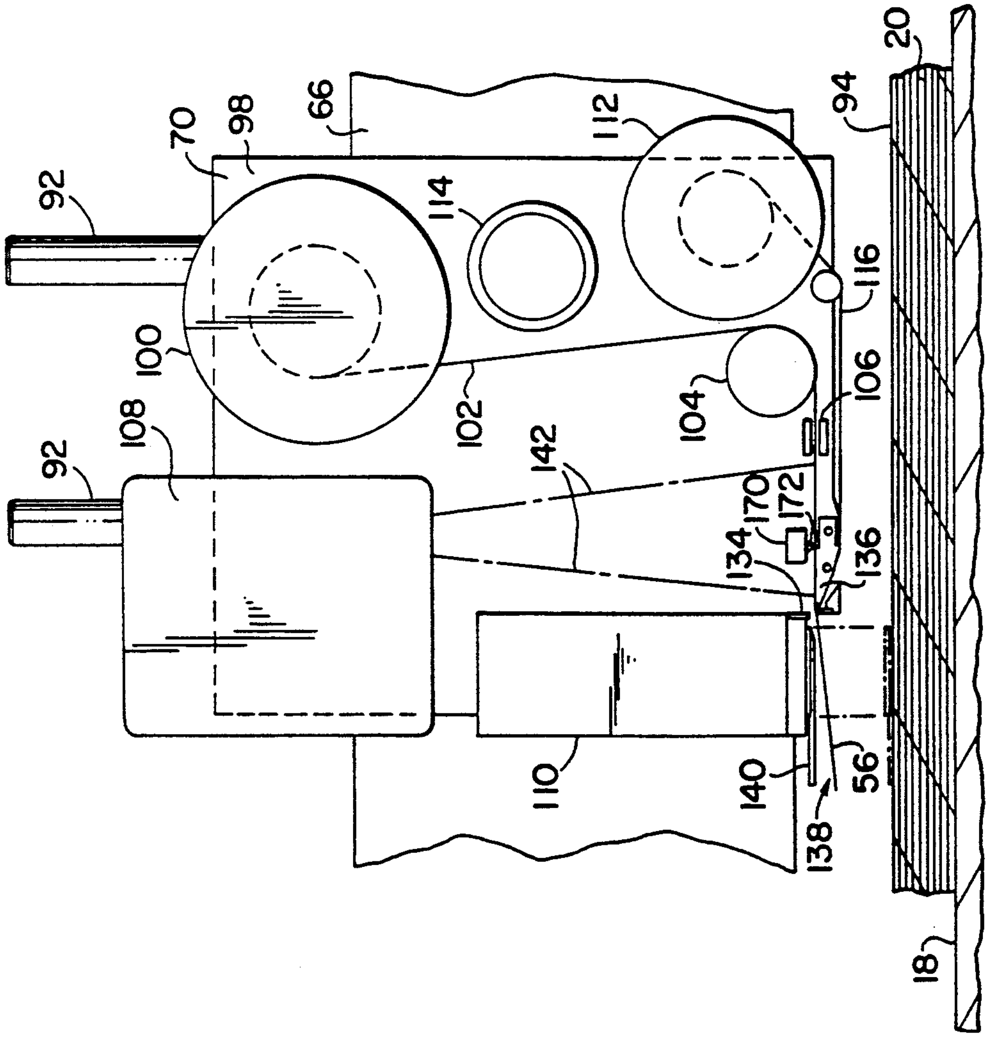
FIG. 3 is a front elevational view of the labeller of the labelling apparatus of FIG. 1.
Figure 5:
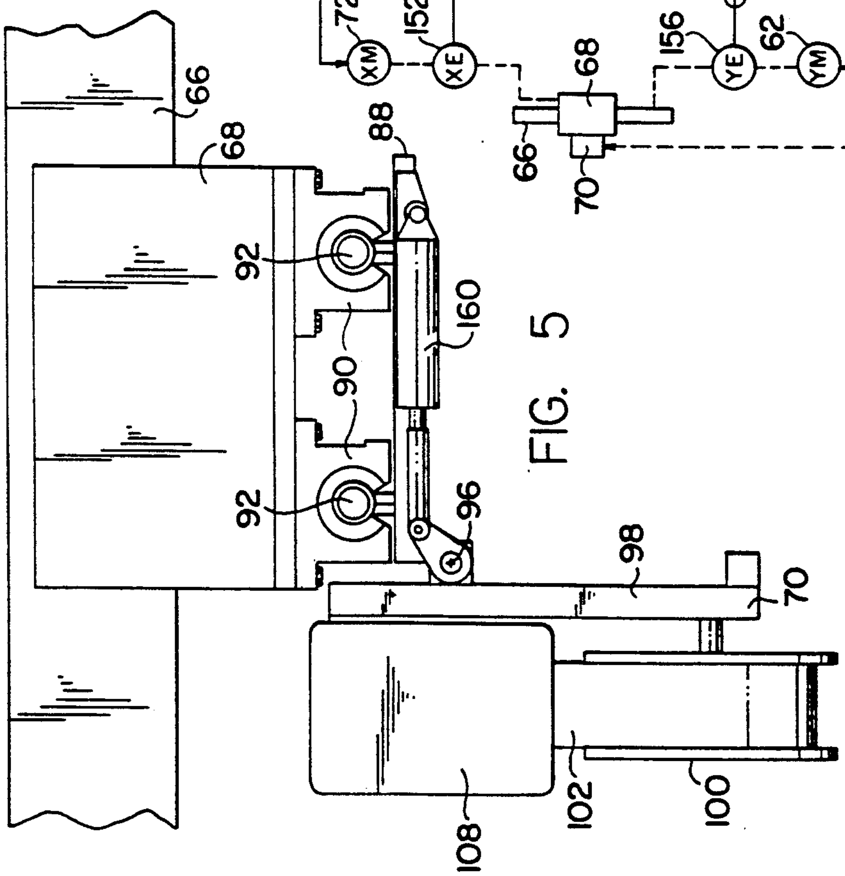
FIG. 5 is a view similar to FIG. 4 but showing the labeller in a second angular position.

The labeller 70 may take many different forms. As illustrated in FIGS. 3, 4, and 5, by way of example, it comprises a base plate 88 carried by the work carriage 68 by means of two guide bushings 90 fixed to the carriage 68 and two guide rods 92 fixed to the base plate and slidably received by the bushings 90 to permit vertical sliding movement of the base plate 88 relative to the work carriage. A suitable adjustment means, not shown, adjustably holds the base plate at a selected vertical height relative to the work carriage 68 to cause the base plate and the remainder of the labeller to be located at an optimum height above the top surface 94 of the lay-up 20. Pivotally connected to the base plate 88 for rotation about a vertical theta axis 96 is a carrier plate 98. Mounted on the carrier plate 98, as best seen in FIG. 3, is a supply spool 100 for holding and receiving a label supply means in a form of an elongated strip of material 102. Also mounted on the carrier plate 98 is an idler guide roll 104, a mark reader 106, an optical bar code reader 108, a label cutting and applicating mechanism 110, a take-up spool 112, and a motor 114 which through a suitable drive train powers the take-up spool 112.

Figure 7:
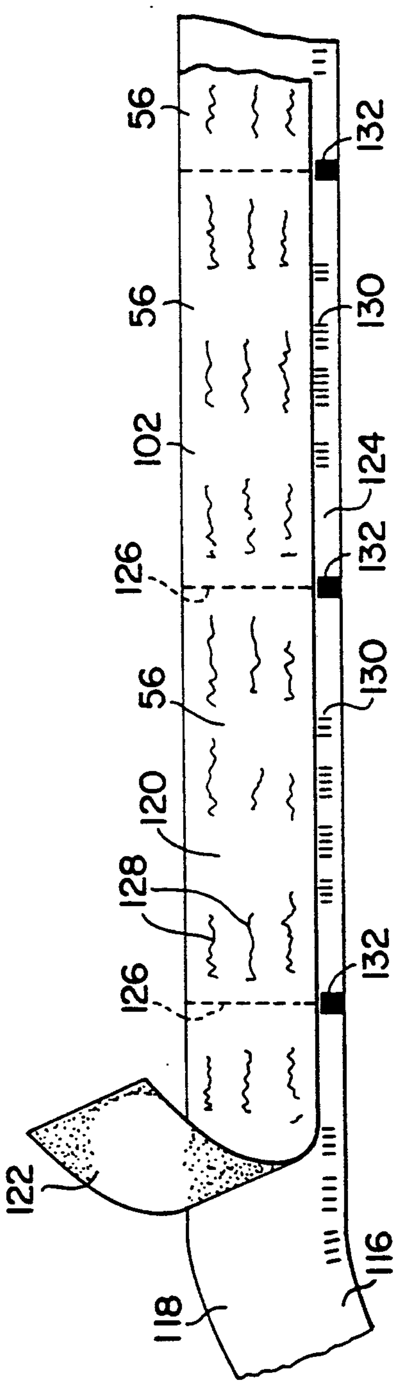
FIG. 7 is a plan view of a portion of the pre-printed strip of material used as the label supply means for the labeller of FIG. 1.

Referring to FIG. 7, the illustrated elongated strip of material 102 constituting the label supply means includes a release strip 116, made of plastic or a heavy paper having a top surface 118 having an adhesive release property such as obtained, for example, by spraying it with a thin coating of silicone material. Releasably adhered to the carrier strip 116 is a label strip 120, made of paper, plastic, or similar flexible material having a bottom surface 122 carrying a layer of adhesive releasably adhering the strip 120 to the carrier strip 116 and also subsequently usable in adhering the labels to the top surface of the work material. The label strip 120 has a width less than the carrier strip 118 so that along one edge of the material strip 102 a marginal portion 124 of the top surface 118 of the carrier strip is exposed. The label strip 120 includes a plurality of labels arranged end to end along its length with the labels being separated from one another by the imaginary lines 126. Printed on each label is a display in the form of text 128 visually providing the desired part identifying information. In the strip 122 one label 56 is provided for each part or pattern piece to be cut from the lay-up 20 for which the strip 102 is provided, and the text 128 printed on each label identifies its respectively associated part.

Also included in the material strip 102 is a machine sensible code associated with each label 56 providing position information identifying the position on the top surface of the work material at which the associated label is to be applied. In the illustrated case this sensible code includes a printed bar code 130 printed on the exposed margin 124 of the carrier strip 116 adjacent the associated label. Such adjacency of a sensible code to its associated label 56 is not, however, necessary and if desired each sensible code may be spaced from its associated label along the length of the strip 102 to suit the particular arrangements and locations of the components of the labeller with which it is used. Still further, the material strip 102 includes a plurality of marks 132 printed on the exposed margin 124 of the carrier strip to provide a machine sensible indication of the beginning and/or end of each label 56. Again, depending on the arrangement of the parts of the labeller these marks need not necessarily be aligned on the strip 102 with the actual beginnings or ends of the labels 56 and indeed each mark could even be located on a label ahead of or behind the one for which it indicates the beginning or end.

Returning to FIG. 3, the material strip 102 passes from the supply spool 100 over the idler guide roll 104 to the cutting station 134 of the cutting and applicator mechanism 110. At this station the carrier strip 116 is pulled over a sharp stationary nose 136 of small radius causing the forwardmost label 56 to be stripped from the carrier strip 116 and to move forwardly to the applicator station 138 while the carrier strip 116 moves rearwardly to the take-up spool 112, the take-up spool 112 being powered in the take-up direction of rotation by the motor 114 to pull the label strip 102 through the path of movement just described. When the labeller 70 is at the position relative to the top surface 94 of the lay-up 20 defined by the position information of the associated sensible code 130, and a full label 56 is at the application station 138, the cutting and application mechanism 120 is actuated which moves a pair of knives at the cutting station 134 past each other to sever the label from the remaining labels and which moves a pressing plate 140 rapidly downwardly from the full line position to the broken line position shown in FIG. 3 to forcibly carry the severed label 56 downwardly and to press it into adhered relationship to the top surface 94 of the lay-up.

As the label strip 102 moves forwardly to the stripping nose 136 it passes the mark reader 106 which optically senses the marks 132 to control the operation of the take-up spool 112 and of the cutting and application mechanism 110. That is, at some time after the leading label 56 is severed from the remaining labels the motor 114 is energized to rotate the take-up spool 112 to move the strip 102 past the mark reader 106. When the next mark 132 is detected the motor 114 is stopped and at this time a full label 56 will be positioned at the label application station 138. The nose 136 and/or the associated knife may impart a slight transverse curvature to the portion of the label extending forwardly from the nose 136 to aid in preventing it from sagging downwardly. Then at the proper time the cutting and applicator mechanism 110 is operated to sever and apply the label to the lay-up. If the labeller 20 is already at the desired position relative to the lay-up 20 when the motor 114 is stopped by the reading of a mark 132, the mechanism 110 may be operated immediately. On the other hand, if the forwardmost label 56 is fully advanced to the application station before the labeller 70 reaches its desired position the operation of the mechanism 110 is delayed and caused to occur immediately upon the desired position being reached.

When the forwardmost label 56 is fully at the label application station 138 the bar code 130 for the next label is read by the bar code reader 108, which is a laser scanning type of reader having a field of view as indicated by the lines 142 of FIG. 3. The information obtained by the reader 108 through this reading process is used by the controller 74 to move the labeller to the position required by the next label.

Figure 6:
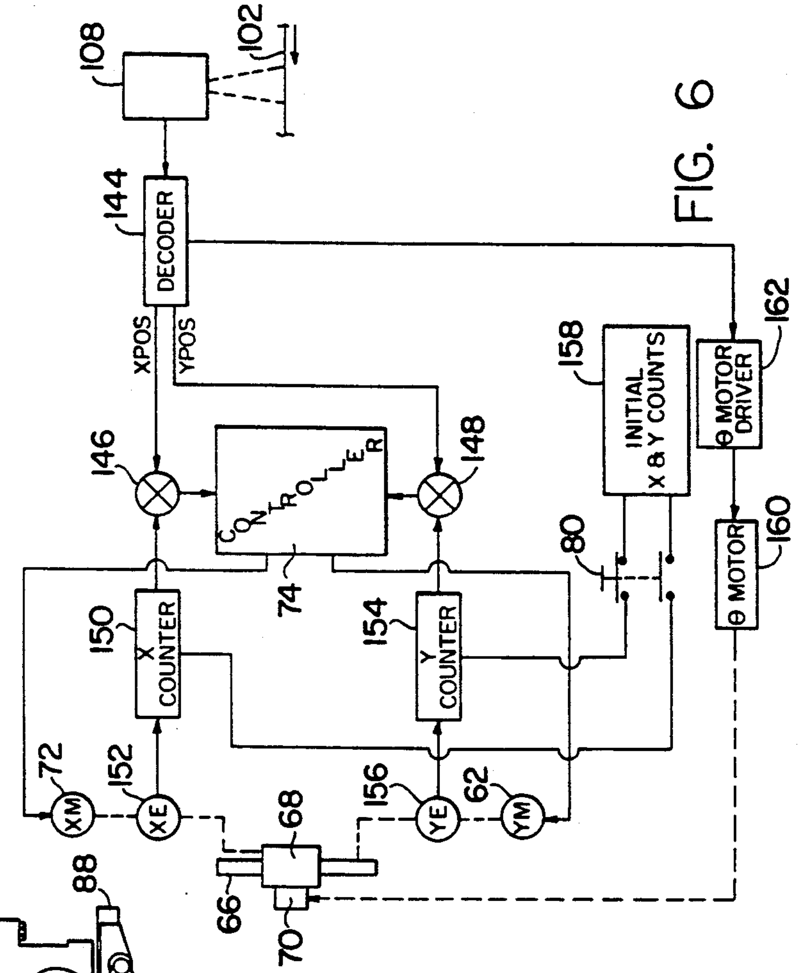
FIG. 6 is a schematic block diagram illustrating the positioning control system for the labeller of FIG. 1.

FIG. 6 shows the major components of the control circuit used to position the labeller 70 in response to the position information derived by the laser reader 108 from the bar codes 130 printed on the label supply strip 102. As shown in that figure, the information read by the reader 108 is supplied to a decoder 144 which extracts from the read information the desired X coordinate of the labeller 70, the desired Y coordinate of the labeller, and the desired theta position of the labeller about the vertical theta axis 96. Considering first the X and Y positioning of the labeller 70, the X and Y coordinates of the desired position are fed from the decoder 144 to comparators 146 and 148. The X comparator 146 is also supplied with the actual X coordinate position of the labeller 70 by an X position memory in the form of an X counter 150 which counts displacement related pulses from an X encoder 152 driven in unison with the X coordinate movement of the work carriage 68 by the X drive motor 72. Likewise, the Y comparator 148 also receives the actual Y position coordinate of the labeller 70 from a Y counter 154 which counts displacement related pulses from a Y encoder 156 driven in unison with the Y coordinate movement of the carriage 60 by the Y motor 62. The error signal produced by the comparator 146 is fed to the controller 74 which produces an output signal supplied to the X motor 62 driving the X motor in such a direction as to null the X error. Similarly, the error signal from the comparator 148 is supplied to the controller 74 which supplies a control signal to the Y motor 72 driving the Y motor in such a direction as to null the related Y error. To correctly correlate the positioning of the labeller with the associated lay-up 20 of work material to be cut, the X and Y counters 150 and 154 may be initialized by depressing the switch 80 to supply to the counters initial values provided by an initial value providing circuit 158 which may, for example, consist of a set of thumb switches allowing an operator to manually select the desired initial values.

It will be appreciated from the above that the described control circuits for the X and Y positioning of the labeller are of well known closed loop type. They could however also be open loop circuits each using a stepping motor. The positioning of the labeller about the vertical theta axis 96 may also be performed by a closed loop control circuit, or an open loop circuit using a stepping motor, allowing the labeller to be set to any desired angle. In the illustrated case, however and as shown by FIGS. 4 and 5, the labeller is movable by a linear solenoid motor 160 between two different angular positions spaced ninety degrees from one another and only an open loop control circuit is used. Therefore, the position information read by the reader 108 for each label defines whether the labeller is to be positioned angularly either as shown in FIG. 4, at which the applied label will have its length extending parallel to the X coordinate direction, or as shown in FIG. 5 at which the applied label will have its length extending in the X coordinate direction. The decoder 144 passes this information to a theta motor driver 162 which in turn produces an output signal operating the drive motor 160 so as to position the labeller 120 in the desired position about the vertical axis 96.

Figure 8:
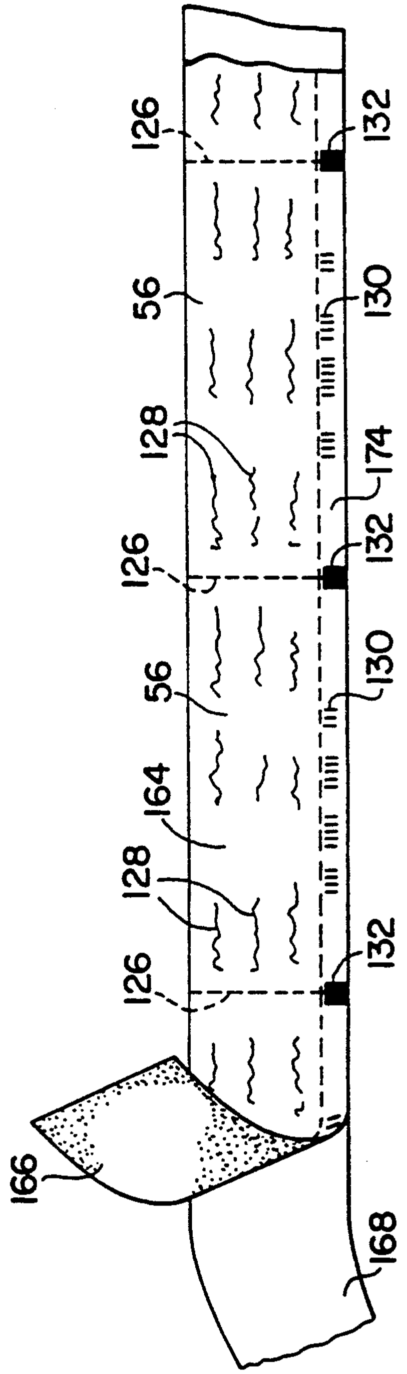
FIG. 8 is a view similar to FIG. 7 but showing an alternate embodiment of the strip of material used on the label supply means.

As mentioned, the label supply means used with the labeller 70 may take various different forms. FIG. 8 shows another such form wherein the supply is in the form of a strip of material 164 generally similar to the strip 102 of FIG. 7 except that the label strip 166 is of the same width as the carrier strip 168, and except for the marks 132 and bar codes 130 being printed directly on the labels 56 along with the text 128 rather than on the carrier strip 168.

Figure 9:
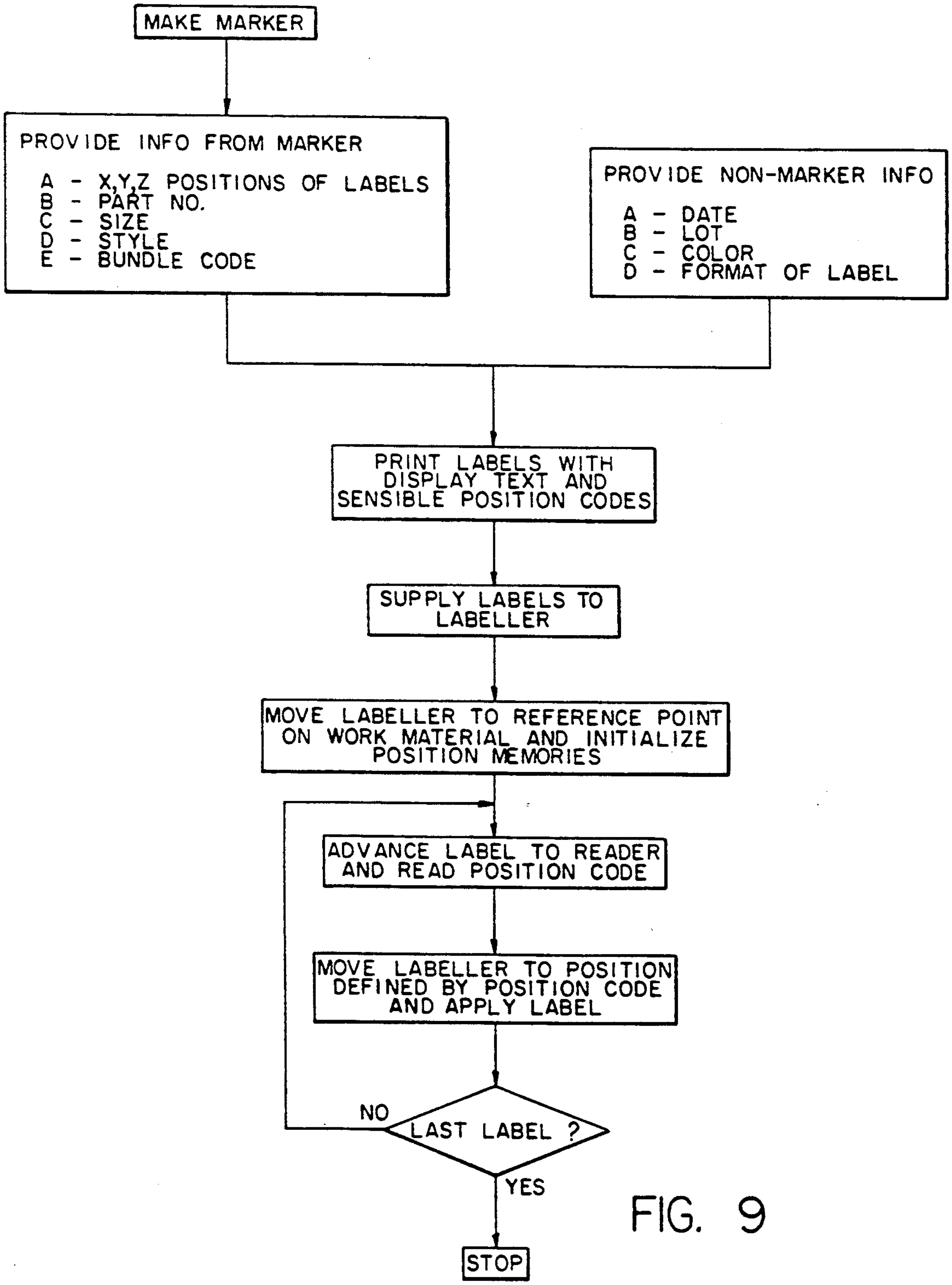
FIG. 9 is a flow diagram illustrating the method of labelling used with the apparatus of FIG. 1.

FIG. 9 shows generally the method of the invention using a labelling apparatus such as described above for the labelling of sheet material to be cut by an automatic cutter. As shown by this figure the first step in the method is to make a marker, which may be accomplished as described by U.S. Pat. No. 3,887,903. Although not shown by FIG. 9 the information provided by this marker is subsequently used to control the operation of automatic cutting machine, such as the above described cutting machine 12, to cut pattern pieces from a quantity of work material in accordance with the marker. As to the labelling procedure, information provided by the marker is combined with non-marker information provided by the customer or cutter, and the combined information is used to print a supply of labels, such as represented by the material strip 102 of FIG. 7 or the strip 164 of FIG. 8, providing for each label a display containing printed text identifying the associated part to be cut from work material and also providing a machine sensible code, such as one of the bar codes 130 of FIGS. 7 or 8, defining the position at which the associated label is to be applied to the work material. This supply of labels is then supplied to a labeller, such as the labeller 70. Before the start of the labelling the labeller is moved to a reference position on the work material and the position memories, such as the X and Y counters 150 and 154 of FIG. 6, are initialized to properly relate the coded position information to positions on the work material. The labeller is then set into operation. In such operation a label is moved past the reader which reads the associated sensible code, after which the labeller is moved to the position defined by the code and the label applied to the work material. This process is then repeated until the last label is reached at which time the labelling process is stopped.

From the foregoing it will be understood that the marks 132 of the label strip 102 of FIG. 7 or of the label strip 164 of FIG. 8 determine the lengths of the labels applied by the labeller 70, and by varying the spacing between successive ones of the marks 132 the lengths of the applied labels may be varied. Other means may of course also be used for varying the lengths of the labels. For example, information defining the desired length of a label may also be included in the machine sensible code 130 associated with each label with the code reader and the controller being responsive to such information to control the feeding and cutting of each label so that the label is produced with the length defined by its associated machine sensible code.

Also, if desired, the labeller and the label supply means used with the labeller may be designed to permit a varying of the width of the labels applied by the labeller. For example, with reference to FIG. 3 the labeller may include a slitting mechanism 170 with a knife 172 for longitudinally slitting the label strip as it moves forwardly toward the stripping nose 136 and cutting station 134. For example, if such a slitter is used with a label supply strip of material such as that shown at 102 in FIG. 8 the knife 172 may be set to cut the strip along the illustrated line 174 of FIG. 8 to allow the portion of the label strip 120 containing the bar codes 130 to be separated from the portion of the label strip 120 containing the display texts 128 and to thereby allow the application to the work material of labels containing only the display text. The knife 172 may be adjustable transversely relative to the material strip 164 to allow variation of the width of each label applied to the work material, and such adjustment may be performed either manually or automatically. In the case of automatic adjustment, the width of each label may be included in the machine sensible code 130 provided for that label and the slitting mechanism 170 through the code reader and the controller may be responsive to such information to set the knife 172 to the transverse position required to produce a label of the width defined by the coded information. Also, where the label supply means is in the form of a strip of material consisting of two or more layers of material, the slitting knife 172 may be set for such a depth of cut so as to cut through only the top layer, to cut through both layers in the case of a double layered strip of material, or to cut through a selected number of layers in the case of a strip of material with more than two layers.

Many different variations in the construction of the labelling apparatus and in the label supply may be made without departing from the scope of the invention. Particularly, it will be understood that in the supply of labels the shape and arrangement of the labels may vary and the labels if desired may be presevered from one another and may also be spaced from one another along the length of the strip. Further, in place of the sensible codes being bar codes the sensible codes may be provided in other ways such as by way of magnetically encoded strips to be read by a magnetically encoded strip reader in place of the bar code reader 108. The sensible codes may also be placed on the bottom surface of the carrier strip or the bottom surface of the label strip and in other instances the carrier strip may be eliminated. Also, the position information provided for each label need not be provided in a single unitary sensitive code and instead such information may be dispersed into a number of subcodes. For example, there may be for each label one subcode read by one reader defining the X coordinate position of the point at which the associated label is to be applied, a second subcode readable by a second reader defining the Y coordinate position of the point at which the label is to be applied, and a third subcode readable by a third reader defining the theta position or angle at which the associated label is to be applied to the work material. Also, in some applications instead of the labeller being movable in both the X and Y coordinate directions relative to ground, the labeller may be movable in only the X coordinate direction with the work material itself being movable in the Y coordinate direction.

Figure 10:
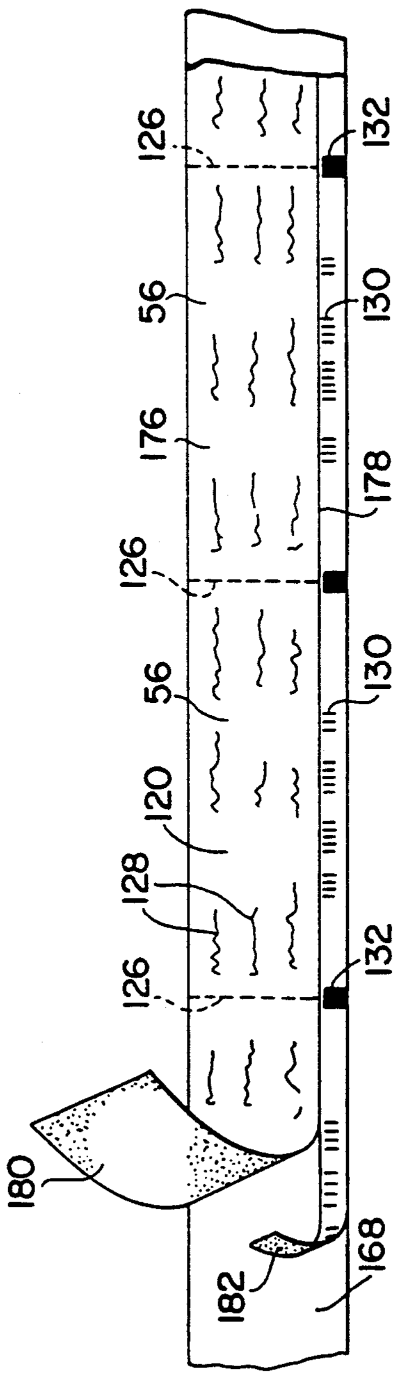
FIG. 10 is a view similar to FIG. 7 but showing another embodiment of the strip of material used as the label supply means.

Also, instead of providing a slitting mechanism such as the mechanism 70 of FIG. 3 the label supply means may be in the form of a strip of material such as shown at 176 in FIG. 10 and which is pre-severed along a longitudinally extending line 178 prior to being placed on the labeller 70. Otherwise, the label supply strip of material may be similar to that of FIG. 8 and has been given the same reference numerals to identify parts similar to those of corresponding parts of FIG. 8. From this it will be seen that the label strip 120 is divided by the line of severance 178 into a portion 180 containing the labels 56 and another portion 182 containing the marks 132 and the bar codes 130. In the application of the labels 56 to the work material by the labeller 70 the portion 180 is stripped from the carrier strip 168 and cut along the lines 126 to separate the labels 56 from one another before application to the work material. The portion 182 containing the marks 132 and bar codes 130 remains with the carrier strip 168 and is wound onto the take-up spool 112.

Figure 11:
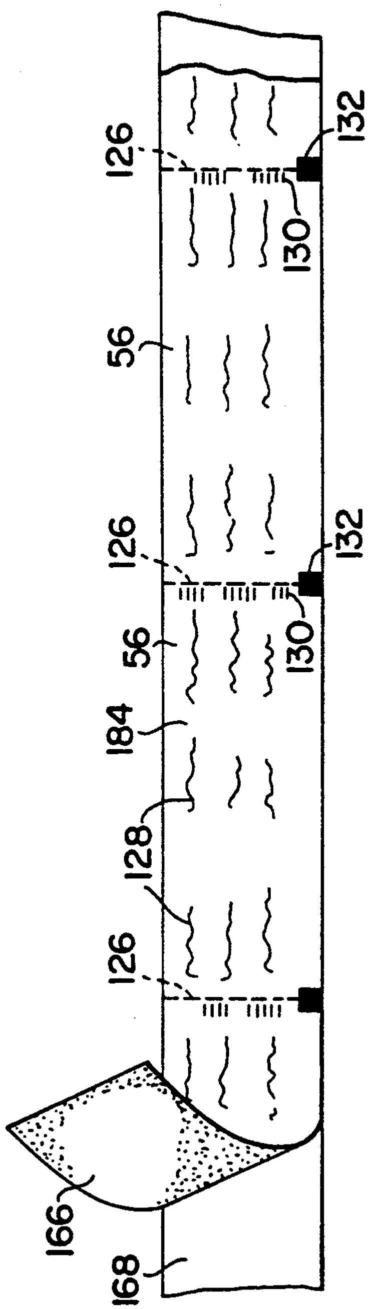
FIG. 11 is a view similar to FIG. 7 but showing still another embodiment of the strip of material used as the label supply means.

Also, instead of the bar codes 130 being located on a label supply strip of material so as to extend longitudinally along the length of such a strip, they may also be placed on the strip of material so as to extend transversely of the strip as shown by the strip of material 184 of FIG. 11.

Figure 12:
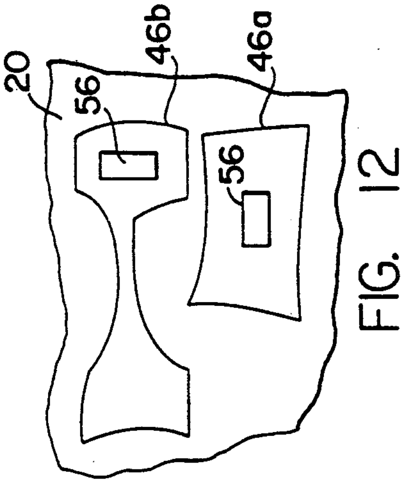
FIG. 12 is a fragmentary plan view of a portion of the work material cut by the cutting system of FIG. 1.

In generating the position information which is supplied to the label supply means to be included in the machine sensitive code defining the position at which labels are to be supplied to the work material, it is generally desirable that the points of label application be selected so that they coincide at least approximately with the center of gravity of the associated cut part. However, in some instances a part may be so shaped that its center of gravity falls at a point having insufficient surrounding area to receive a label. Therefore, in the later instance the point of label application is selected to be one spaced from the center of gravity and falling into an area of the part of sufficient size to receive the label. For example, in FIG. 12 the illustrated part **46*a* represents a cut part wherein the associated label is applied approximately at the part's center of gravity. The part 46*b*** however has its center of gravity falling in an area of insufficient size to receive the label and the label is therefore instead placed as shown in a larger size portion of the part.

I claim:

1. For use in a sheet material cutting system, a labelling apparatus for applying labels to the top surface of work material supported in spread condition on a supporting surface to identify parts cut or to be cut from the work material, and for use with a label supply means providing a plurality of preprinted labels and also providing for each label a machine sensible code containing position information defining the position at which the label is to be applied to the top surface of the work material, said labelling apparatus comprising:

means for receiving and holding a label supply means such as aforesaid, reading means for reading the sensible codes associated with the labels of the supply means received and held by said receiving and holding means, means responsive to said reading means for moving said labels and work material supported on said supporting surface relative to one another to bring said labels to the positions, on the top surface of the work material supported by said supporting surface, defined by said sensible codes, and means operable after said defined positions are reached by said labels for applying them to the the top surface of the work material supported by said supporting surface.

2. For use in a sheet material cutting system, a labelling apparatus for applying labels to the top surface of work material supported in spread condition on a supporting surface to identify parts cut or to be cut from the work material, and for use with a label supply means providing a plurality of preprinted labels and also providing for each label a machine sensible code containing position information defining the position at which the label is to be applied to the top surface of the work material, said labelling apparatus comprising:

a labeller, means supporting said labeller for movement relative to said supporting surface to bring it to any desired position on the top surface of the work material supported by said supporting surface, means included in said labeller for receiving and holding a label supply means such as aforesaid, reading means included in said labeller for reading the sensible codes associated with the labels of the supply means received and held by said labeller, means responsive to said reading means for moving said labeller relative to said supporting surface to bring it to the position on said work material defined by the position information associated with a label, and means operable after said defined position is reached by said labeller for applying the associated label to the top surface of said work material.

3. A labelling apparatus as defined in claim 2 further characterized by:

said means for moving said labeller including a carriage cooperable with said supporting surface so as to extend in a first coordinate direction across the work material supported by said supporting surface and movable in a second coordinate direction along the length of the work material supported by said supporting surface, and means supporting said labeller on said carriage for movement relative to said carriage in said first coordinate direction.

4. A labelling apparatus as defined in claim 3 further characterized by:

a table providing said supporting surface, and means adapting said carriage for releasable connection with said table so as to permit its easily being brought into and out of association with said supporting surface.

5. A labelling apparatus as defined in claim 2 further characterized by:

said means for moving said labeller including a first means for moving said labeller in a first coordinate direction relative to said supporting surface, a second means for moving said labeller in a second coordinate direction relative to said supporting surface, a first encoding means providing information defining the actual position of said labeller in said first coordinate direction, a second encoder means providing information defining the actual position of said labeller in said second coordinate direction, and a controller responsive to the actual position information provided by said first and second encoding means and to the position information provided by any one of said sensible codes for operating said first and second drive means to bring said labeller to the position defined by said position information.

6. A labelling apparatus as defined in claim 5 further characterized by:

said means for moving said labeller in said first coordinate direction being a carriage movable relative to said supporting surface in said first coordinate direction and which carriage carries said controller.

7. A labelling apparatus as defined in claim 5 further characterized by:

means for setting said first and second encoding means to desired starting values when said labeller is aligned with a given reference point on the work material supported by said supporting surface.

8. A labelling apparatus as defined in claim 2 for use with a label supply means wherein said labels are of generally elongated shape and wherein each of said sensible codes also includes information defining an angle about a theta axis extending perpendicularly to said supporting surface at which the associated label is to be applied to said top surface of said work material, further characterized by means responsive to said reading means for moving said labeller to the angle about a theta axis extending perpendicularly to said supporting surface defined by the position code associated with a label.

9. A labelling apparatus as defined in claim 2 for use with a label supply means wherein each of said sensible codes consists of a printed bar code, further characterized by:

said reading means being a bar code reader.

10. A labeler as defined in claim 2 for use with a label supply means wherein each of said sensible codes consists of a magnetically encoded strip of magnetic material, further characterized by:

said reading means being a magnetically encoded strip reader.

11. A labelling apparatus as defined in claim 2 for use with a label supply means wherein said labels are a part of an elongated strip of material and wherein said sensible codes are located on said elongated strip of material at areas of said elongated strip separate from the areas occupied by said labels, further characterized by:

said labeller including means for separating said labels from one another and from the remainder of said elongated strip of material and for applying said labels individually to the top surface of said work material without applying to said top surface of said work material any of said areas of said elongated strip containing said sensible codes.

12. A labelling apparatus as defined in claim 2 for use with a label supply means wherein said labels are arranged in succession along the length of an elongated strip of material and wherein said elongated strip of material includes a plurality of marks spaced from one another along the length of the strip material in accordance with the lengths of said labels, further characterized by said labeller including strip feeding means for feeding said length of said strip material forwardly along its length, mark sensing means for sensing the appearances of said marks as said length of strip material is moved forwardly, and means responsive to said mark sensing means for controlling the operation of said strip feeding means.

13. A labelling apparatus as defined in claim 12 for use with a label supply means wherein said labels are initially joined end to end with one another, further characterized by:

said labeller including a cutter for severing a label from the remaining ones of said labels and a label applicator for moving a severed label from said cutter to the top surface of the work material supported by said supporting surface and for pressing it against said top surface, and means responsive to said mark sensing means for also controlling the operation of said cutter and said label applicator.

14. A labelling apparatus as defined in claim 2 further characterized by:

a means for varying the width of said labels.

15. A labelling apparatus as defined in claim 2 further characterized by:

a means for varying the length of said labels.

16. In a sheet material cutting system, the combination comprising:

work material supporting means providing a supporting surface for supporting work material spread thereon, a carriage supportable on said work material supporting means so as to extend in a first coordinate direction across work material supported on said supporting surface and so as to be movable in a second coordinate direction relative to said supporting surface along the length of the work material supported thereon, a labelling device carried by said carriage for movement relative thereto in said first coordinate direction, said labelling device including means for receiving and holding an elongated strip of material providing a plurality of labels arranged in succession along the length of said strip of material and also providing a plurality of machine sensible codes each associated with a respective one of said labels, each of said sensible codes including position information defining the point at which the associated label is to be applied to the top surface of work material supported by said supported surfaces, a reading means in said labelling device for reading the sensible codes associated with the labels of said elongated strip of material received and held by said labelling device, means carried by said carriage and responsive to said reading means for moving said carriage relative to said supporting surface in said first coordinate direction and for moving said labelling device relative to said carriage in said second coordinate direction to bring said labelling device to the position, on the top surface of work material supported by said supporting surface, defined by the position information associated with a label, and said labelling device including means operable after a position defined by position information is reached by said labelling device for applying the associated label to the top surface of the work material supported by said supporting surface.

17. The combination defined in claim 16 further characterized by each of said sensible codes also including angle information defining the angle at which the associated label is to be applied to the top surface of work material supported by said supporting surface, and means responsive to said reading means for moving at least a part of said labelling device about an axis perpendicular to said supporting surface to cause the associated label to be applied to said work material at the angle defined by said angle information.

18. A labelling apparatus for applying labels to the top surface of work material, consisting of a single sheet of sheet material or a lay-up of sheets of sheet material, to identify parts cut or to be cut from the work material in accordance with a pre-known layout of the pieces, said labelling apparatus comprising:

a labeller for receiving a label supply means providing a plurality of pre-printed labels and also providing for each such label a machine sensible code containing position information defining the position at which the label is to be applied to the top surface of work material, and means responsive to said sensitive codes for moving said labeller relative to said work material to bring it to the positions on the top surface of said work material defined by said sensitive codes.

19. A labelling apparatus as defined in claim 18 further characterized by each of said sensible codes also including angle information defining the angle at which the associated label is to be applied to the top surface of sheet material, and means responsive to said sensitive codes for moving at least a part of said labeller about an axis of rotation to cause the label associated with each sensitive code to be positioned at the angle defined by the angle information of said sensitive code.

20. A limp sheet material cutting system comprising:

a plurality of spreading tables for spreading and supporting limp sheet material to be cut, cutting means for cutting the sheet material spread on each of said spreading tables, and a single unitary labelling apparatus usable alternatively with any one of said spreading tables to apply labels to the work material spread and supported thereon to identify pieces to be cut from such work material, said labelling apparatus including means for receiving and holding a label supply means providing a plurality of preprinted labels and also providing for each label a machine sensible code containing position information defining the position at which the label is to be applied to the top surface of the associated work material, said labelling apparatus including reading means for reading the sensible codes associated with the labels of the label supply means received and held by said receiving and holding means, said labelling apparatus also including means responsive to said reading means for moving said labels relative to the spreading table with which said labelling apparatus is associated to bring them to the positions, on the top surface of the work material supported by the associated spreading table, defined by said sensible codes, and said labelling apparatus also including means operable after said defined positions are reached by said labels for applying them to the top surface of the work material supported by the associated spreading table.

21. A method for cutting limp sheet material, said method comprising:

preparing a marker indicating the shapes and arrangements of parts to be cut from a quantity of work material consisting of a single sheet or a lay-up of sheets of sheet material, preparing a set of cutting information usable by an automatic cutting machine to cut parts from a quantity of work material in accordance with said marker, preparing a set of label information relating to labels to be applied to a quantity of work material to identify the parts cut therefrom in accordance with said marker, said label information including for each label display information to be displayed by the label position information defining the position at which the label is to be applied to the work material, providing a quantity of work material supported in spread condition on a supporting surface, using said label information to provide a plurality of labels each associated with a respective one of the pattern pieces to be cut from said work material and each of which labels includes a display area containing printed text legibly conveying the associated display information, also using said label information to provide for each of said labels a machine sensible code containing the associated label position information, reading each of said sensible codes with a sensor to extract therefrom its label position information, using said extracted label position information to position and apply the associated label at the position on said work material defined by said label position information, and either before or after the application of said labels to said work material, cutting said work material by means of an automatic cutting machine controlled by said cutting information to cut parts therefrom in accordance with said marker.

22. A method for cutting limp sheet material as defined in claim 21 further characterized by preparing said set of label information so that said label position information also includes information defining the angle at which the associated label is to be applied to the work material, and, in the positioning and application of the associated label on and to the work material, rotating the associated label to bring it to the angular position defined by said angle information.

23. A method for labelling parts cut or to be cut from a quantity of work material consisting of a single sheet or a lay-up of sheets of sheet material, said method comprising:

providing a supply of labels which supply includes a plurality of labels each associated with a respective one of the parts cut or to be cut from a quantity of work material and which supply also includes for each label an associated machine sensible code defining the position at which the label is to be applied to the top surface of the work material, moving said sensitive codes past a reader for reading the positions at which the associated labels are to be applied to the work material, and in response to the output of said reader automatically moving the associated labels to and applying them at the positions on said work material defined by said sensible codes.

* * * * *